(12) United States Patent
Long et al.

(10) Patent No.: US 9,751,166 B2
(45) Date of Patent: Sep. 5, 2017

(54) APPARATUS AND METHODS FOR MANIPULATING A FASTENER

(71) Applicant: The Boeing Company, Huntington Beach, CA (US)

(72) Inventors: Daniel Thomas Long, Federal Way, WA (US); Kevin Michael Bell, Maple Valley, WA (US); Theodore W. Pitt, Renton, WA (US)

(73) Assignee: The Boeing Company, Chicago, IL (US)

( * ) Notice: Subject to any disclaimer, the term of this patent is extended or adjusted under 35 U.S.C. 154(b) by 576 days.

(21) Appl. No.: 14/326,613

(22) Filed: Jul. 9, 2014

(65) Prior Publication Data
US 2016/0008933 A1 Jan. 14, 2016

(51) Int. Cl.
*B23P 19/00* (2006.01)
*B21J 15/14* (2006.01)
*B21J 15/32* (2006.01)

(52) U.S. Cl.
CPC .......... *B23P 19/002* (2013.01); *B21J 15/142* (2013.01); *B21J 15/32* (2013.01); *B23P 19/001* (2013.01); *B23P 2700/01* (2013.01)

(58) Field of Classification Search
CPC ....... B23P 11/00; B23P 11/005; B23P 11/022; B23P 11/027; B23P 13/00; B23P 15/00
See application file for complete search history.

(56) References Cited

U.S. PATENT DOCUMENTS

| 2,540,604 | A | 2/1951 | Van Sittert et al. | |
| 4,027,520 | A | 6/1977 | Klein | |
| 4,643,344 | A | 2/1987 | Kaita et al. | |
| 4,744,238 | A | 5/1988 | Halbert | |
| 6,228,007 | B1 * | 5/2001 | Quak | B23B 41/12 408/51 |
| 6,347,449 | B1 | 2/2002 | Calkins et al. | |
| 2003/0164381 | A1 | 9/2003 | Goodsmith et al. | |
| 2005/0265798 | A1 * | 12/2005 | Boyl-Davis | B23Q 9/0014 408/76 |
| 2009/0266866 | A1 | 10/2009 | Davies et al. | |
| 2011/0095065 | A1 | 4/2011 | Clisset | |
| 2011/0252626 | A1 | 10/2011 | Williams | |
| 2013/0255053 | A1 | 10/2013 | Erickson | |

(Continued)

OTHER PUBLICATIONS

U.S. Appl. No. 13/693,958, filed Dec. 4, 2012, entitled Joining Composite Components Using Low Temperature Thermoplastic Film Fusion.

*Primary Examiner* — Lee D Wilson
(74) *Attorney, Agent, or Firm* — Armstrong Teasdale LLP

(57) ABSTRACT

One example of the present disclosure relates to an apparatus for manipulating a fastener. The apparatus comprises a chamber that includes a first location and a second location. A first actuator is movable between a first position, contiguous with the first location, and a second position, contiguous with the second location. A second actuator is movable between a third position, contiguous with the second location, and a fourth position, contiguous with a third location. A third actuator is movable between a fifth position, contiguous with the third location, and a sixth position, contiguous with the fourth location. The third location is at least partially outside the chamber, and the fourth location is entirely outside the chamber.

20 Claims, 12 Drawing Sheets

(56) References Cited

U.S. PATENT DOCUMENTS

2015/0183068 A1\* 7/2015 Barone ................... B23P 19/04
  29/897.3
2016/0008933 A1\* 1/2016 Long .................... B23P 19/002
  221/1

\* cited by examiner

APPARATUS AND METHODS FOR MANIPULATING A FASTENER

BACKGROUND

The field of the disclosure relates generally to automated handling of fasteners, and, more particularly, to apparatus and methods for manipulating a fastener for use by a tool.

At least some known tools, such as multi-function end effectors, are designed to operate automatically on a fastener. Furthermore, at least some known tools include an apparatus to position fasteners for use by the tool. At least some known fastener positioning apparatus are sized and/or configured to operate on structures that are easily accessible, including, for example, the fuselage or wing panels and spars of an aircraft. However, at least some known structures, such as an aft fairing heat shield of an aircraft, have confined spaces within which at least some known fastener positioning apparatus are too large to operate. As such, at least some known tools cannot be used in such space-constrained/limited areas, or must be operated without the benefit of an automated fastener positioning apparatus. Operation of the tool without an automated fastener positioning apparatus, or use of a substitute non-automated tool, in such circumstances may be time consuming and/or tedious.

SUMMARY

Accordingly, apparatus and method, intended to address the above-identified concerns, could find utility.

One example of the present disclosure relates to an apparatus for manipulating a fastener. The apparatus comprises a chamber that includes a first location and a second location. A first actuator is movable between a first position, contiguous with the first location, and a second position, contiguous with the second location. A second actuator is movable between a third position, contiguous with the second location, and a fourth position, contiguous with a third location. A third actuator is movable between a fifth position, contiguous with the third location, and a sixth position, contiguous with the fourth location. The third location is at least partially outside the chamber, and the fourth location is entirely outside the chamber.

One example of the present disclosure relates to a method of manipulating a fastener. The method comprises delivering the fastener to a first location in a chamber, moving the fastener from the first location to a second location in the chamber using a first actuator, moving the fastener from the second location to a third location using a second actuator, and moving the fastener from the third location to a fourth location using a third actuator. The third location is at least partially outside the chamber and the fourth location is entirely outside the chamber.

BRIEF DESCRIPTION OF THE DRAWINGS

Figure 1:
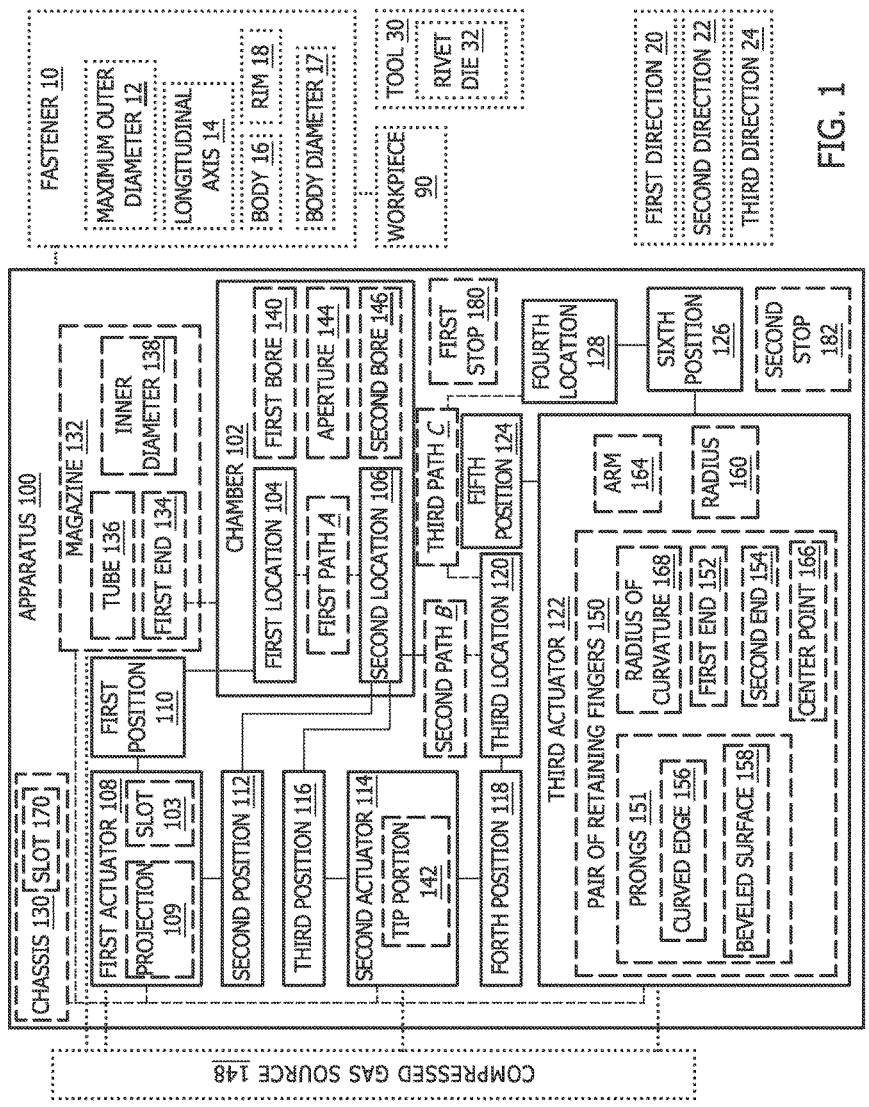
Figure 2:
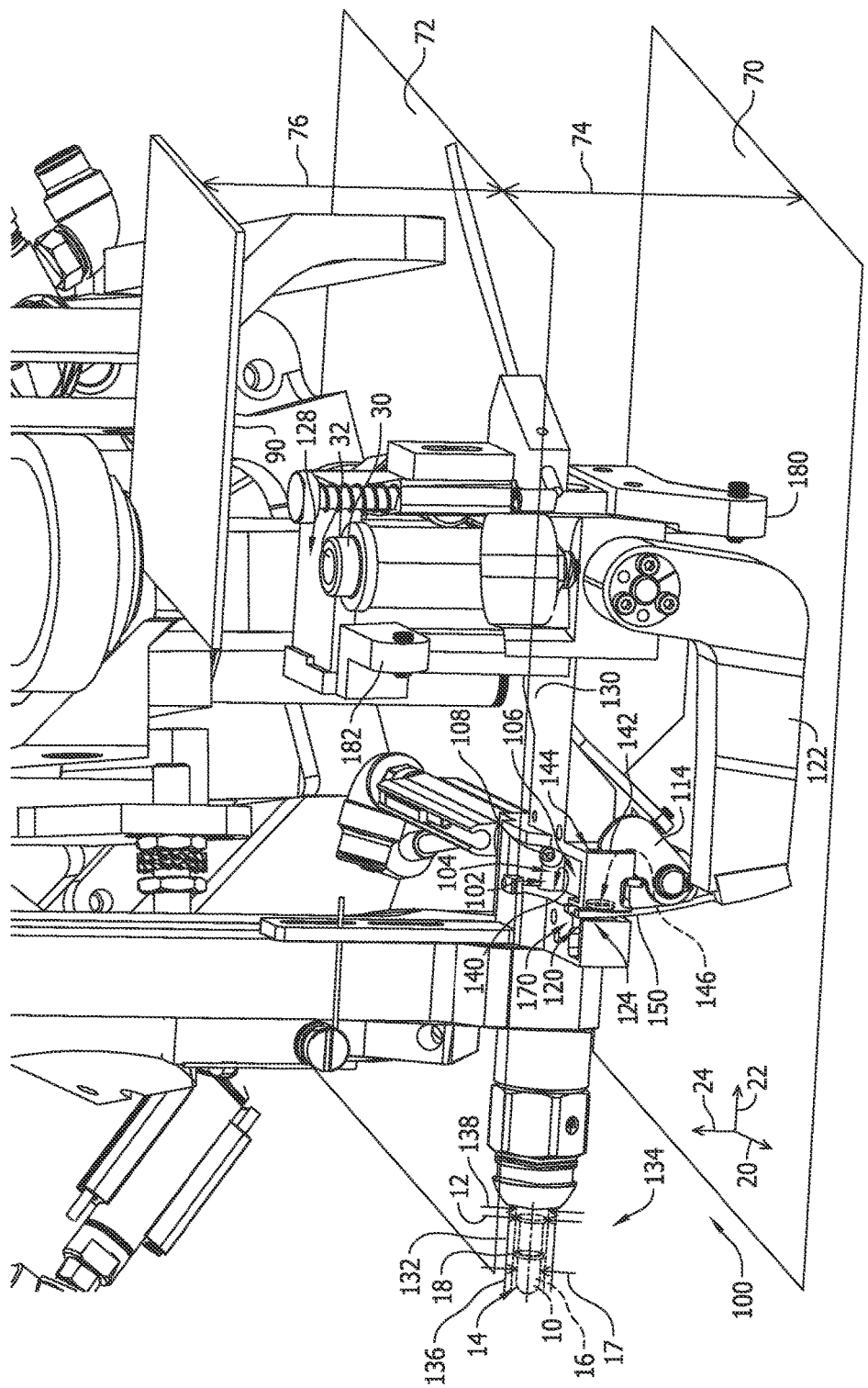
Figure 3:
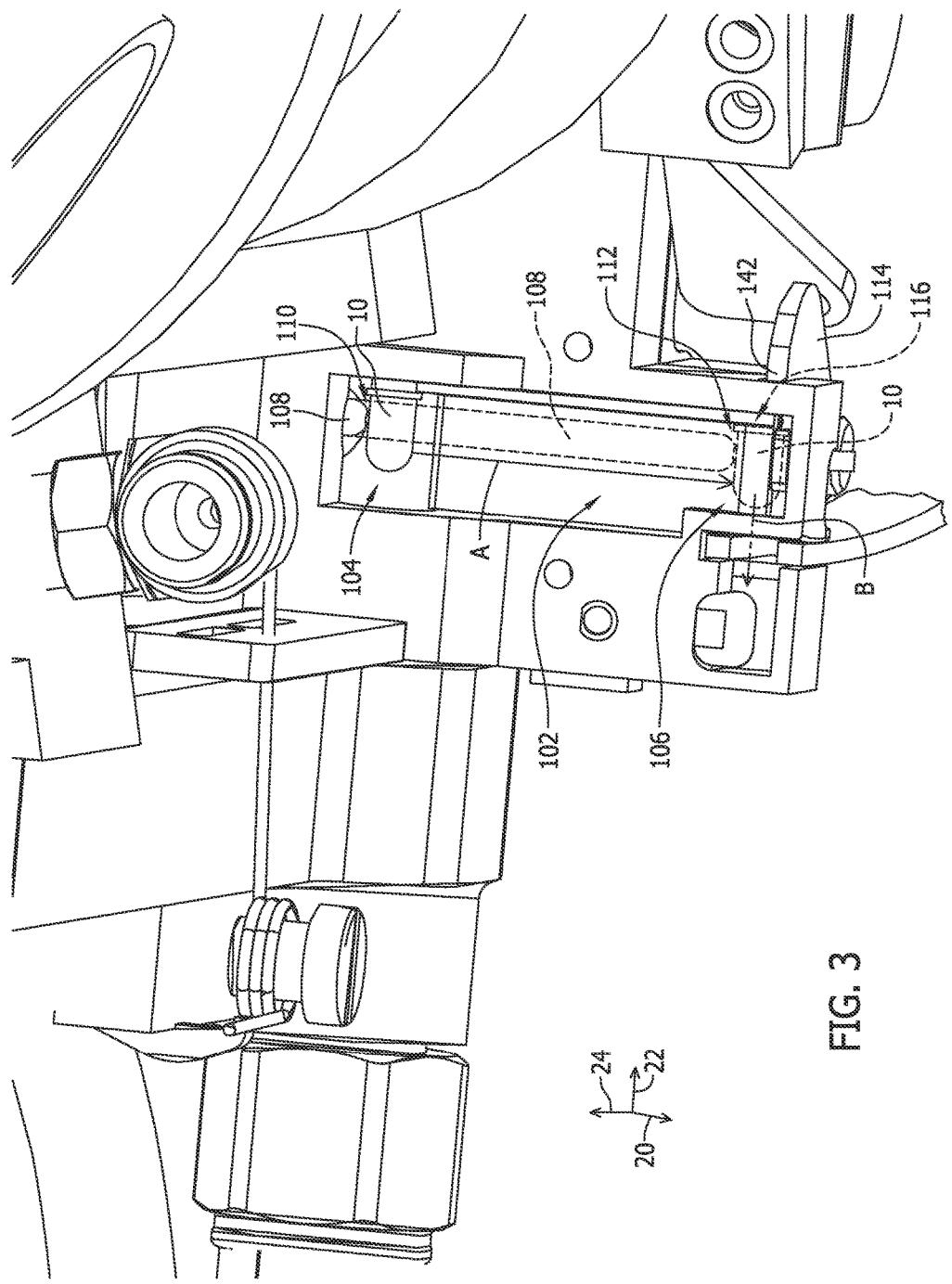
Figure 4:
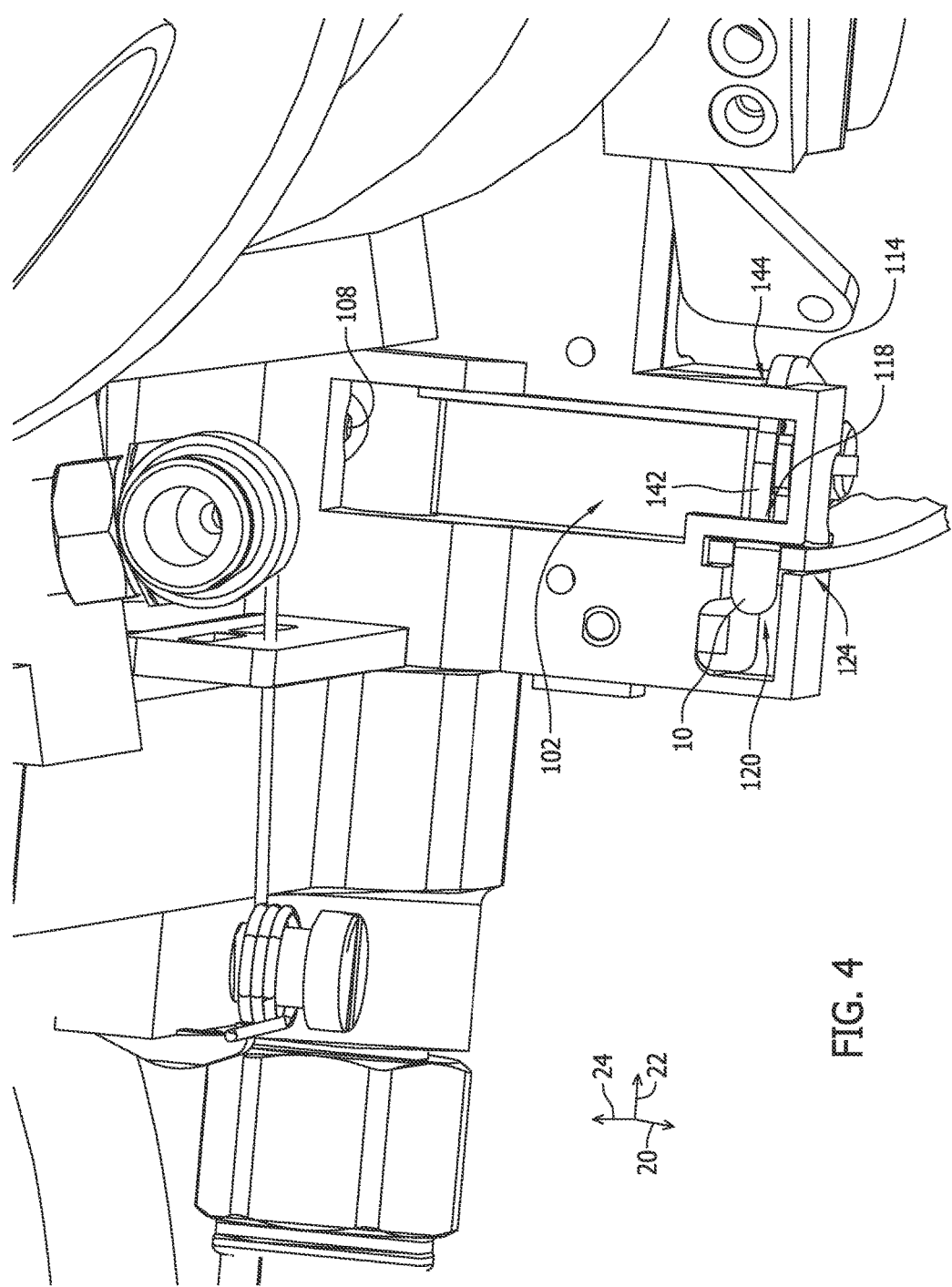
Figure 5:
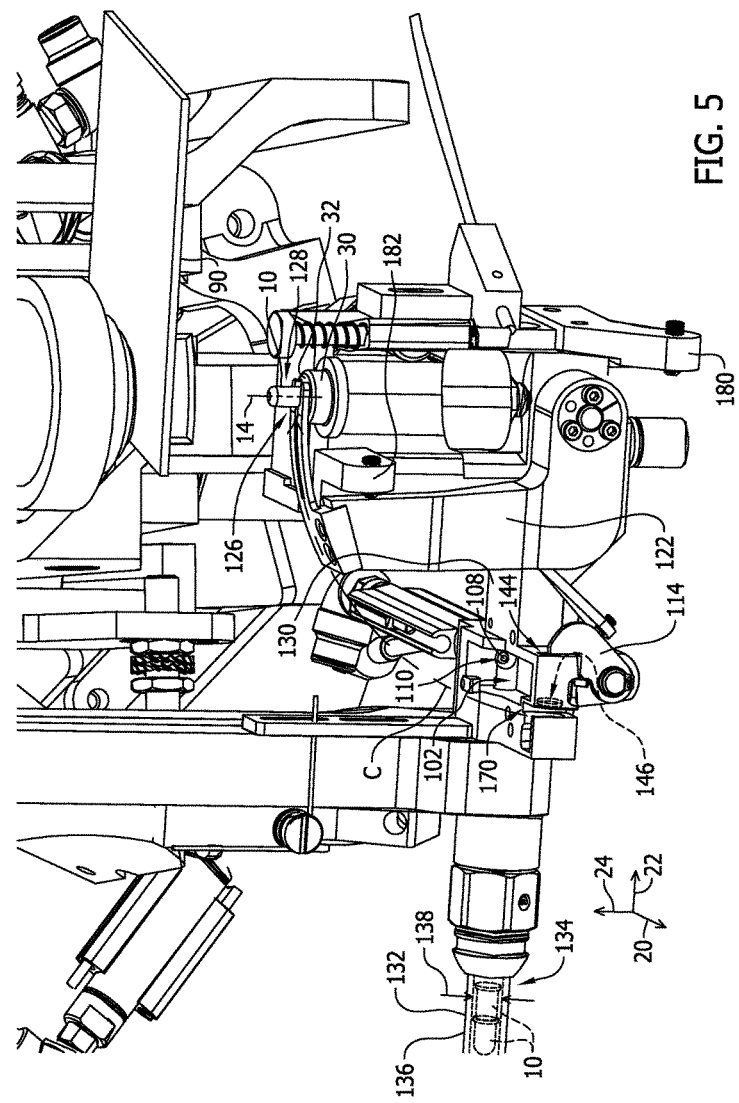
Figure 6:
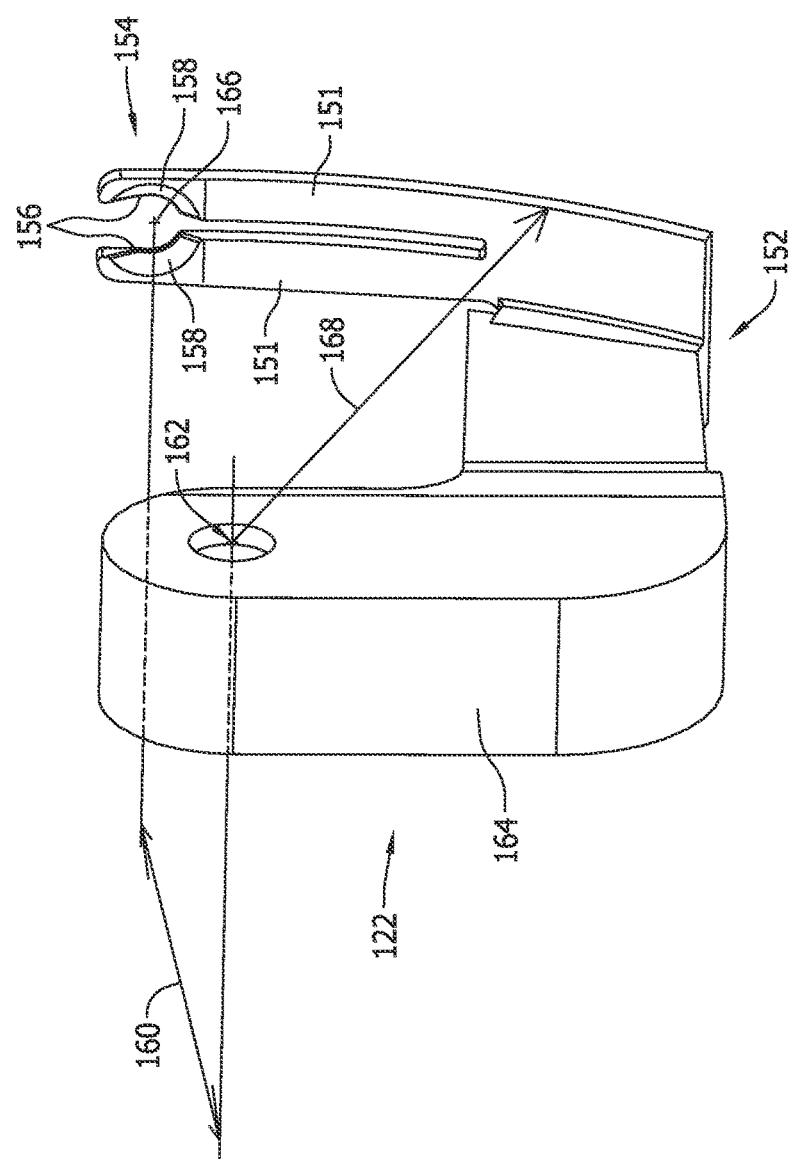
Figure 7:
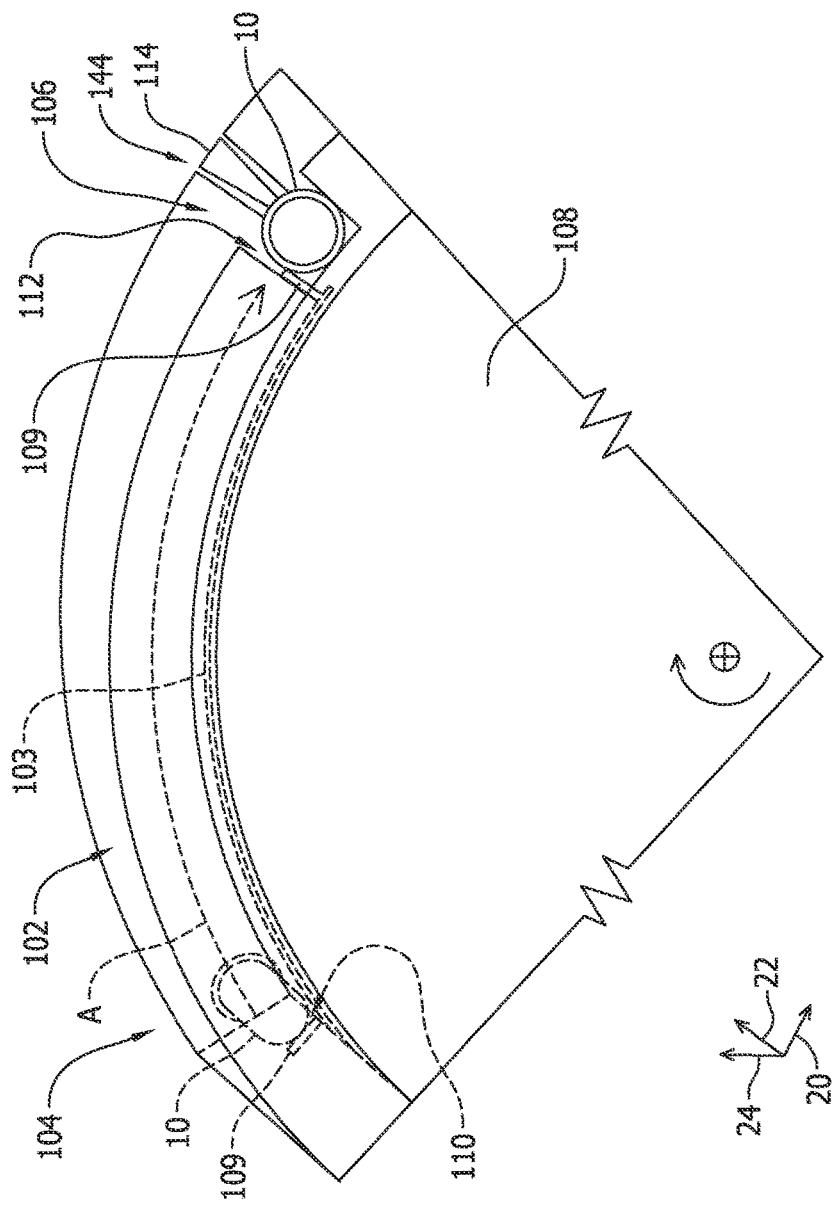
Figure 8:
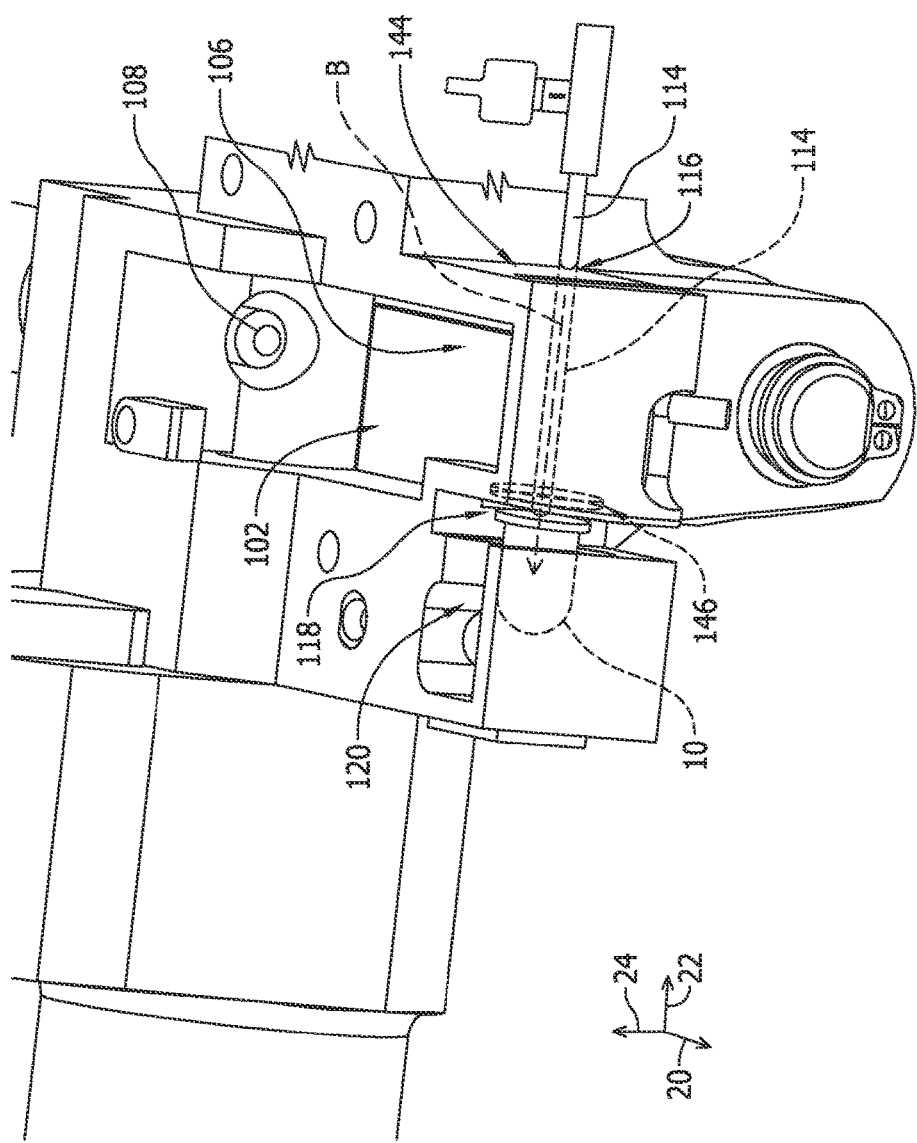
Figure 9A:
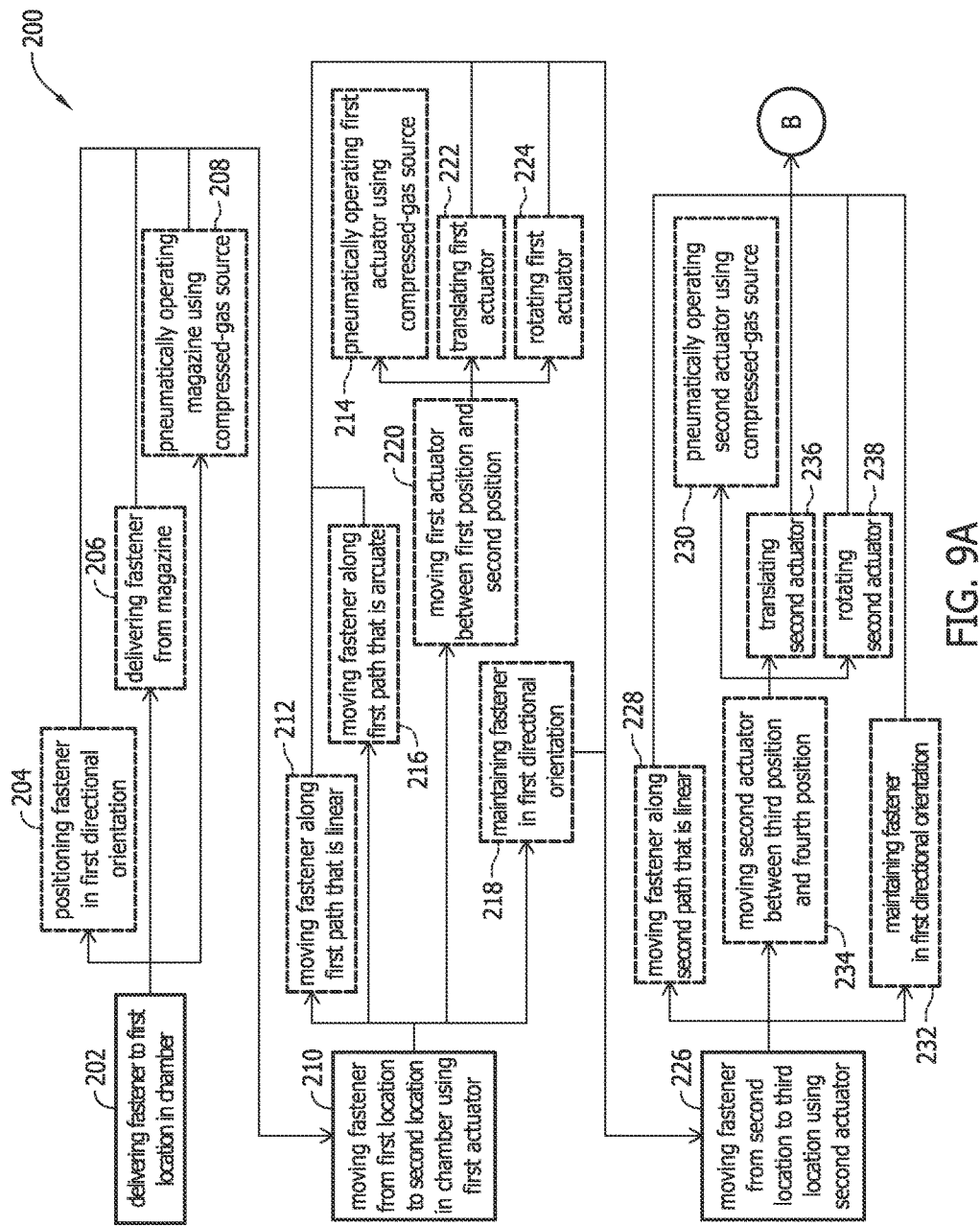
Figure 9B:
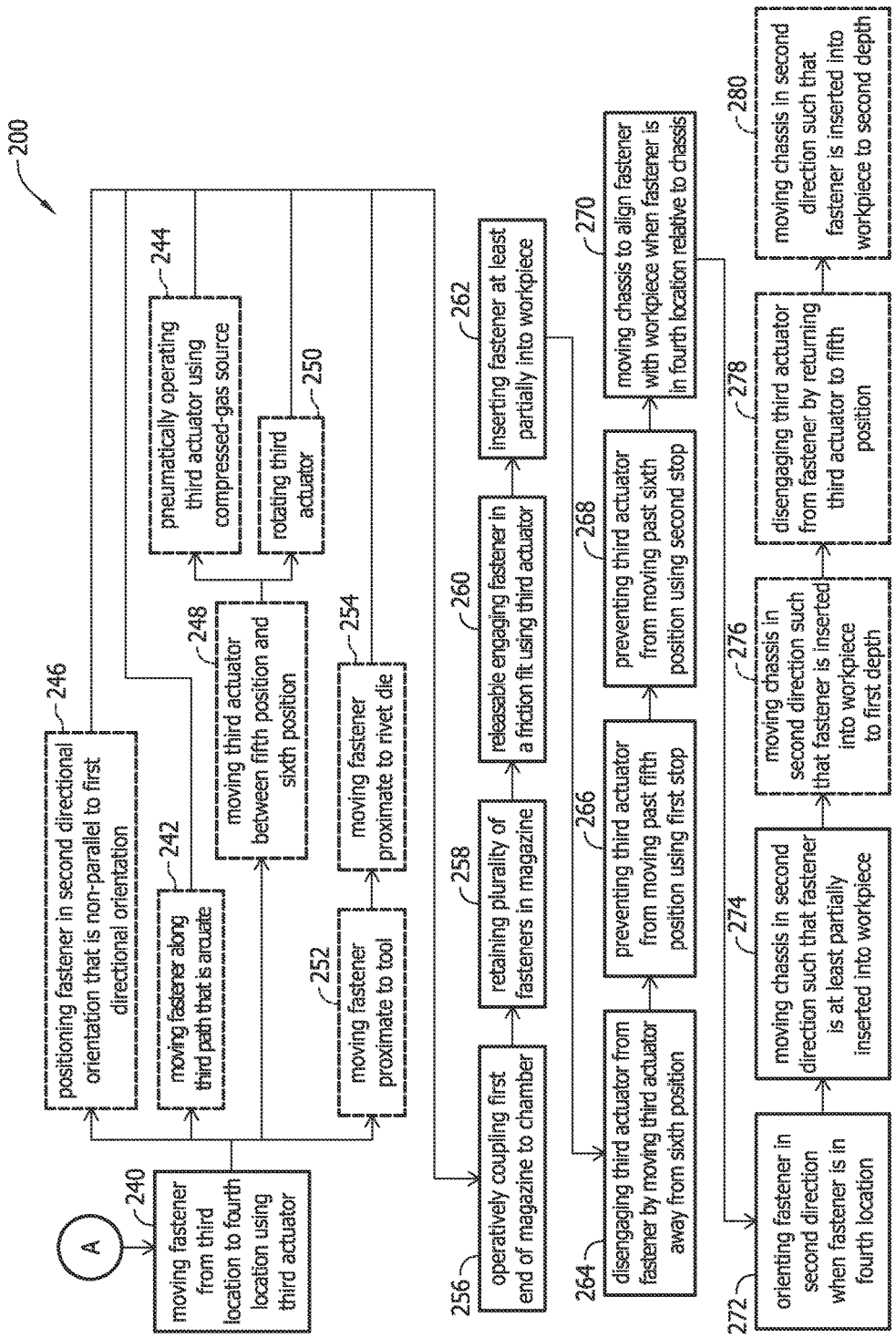

Having thus described examples of the disclosure in general terms, reference will now be made to the accompanying drawings, which are not necessarily drawn to scale, and wherein like reference characters designate the same or similar parts throughout the several views, and wherein:

FIG. 1 is a block diagram of an apparatus for manipulating a fastener, according to one aspect of the present disclosure;

FIG. 2 is a schematic perspective view of the apparatus of FIG. 1, according to one aspect of the disclosure;

FIG. 3 is a schematic perspective view of a chamber of the apparatus of FIG. 1, according to one aspect of the disclosure;

FIG. 4 is a schematic perspective view of the chamber of the apparatus of FIG. 1, according to one aspect of the disclosure;

FIG. 5 is a schematic perspective view of the apparatus of FIG. 1, according to one aspect of the disclosure;

FIG. 6 is a schematic perspective view of a third actuator of the apparatus of FIG. 1, according to one aspect of the disclosure;

FIG. 7 is a schematic perspective view of an alternative chamber and an alternative first actuator that may be used with the apparatus of FIG. 1, according to one aspect of the disclosure;

FIG. 8 is a schematic perspective view of the chamber of the apparatus of FIG. 1 and an alternative second actuator that may be used with the apparatus of FIG. 1, according to one aspect of the disclosure;

FIGS. 9A and 9B are a block diagram of a method of manipulating a fastener, according to one aspect of the disclosure.

Figure 10:
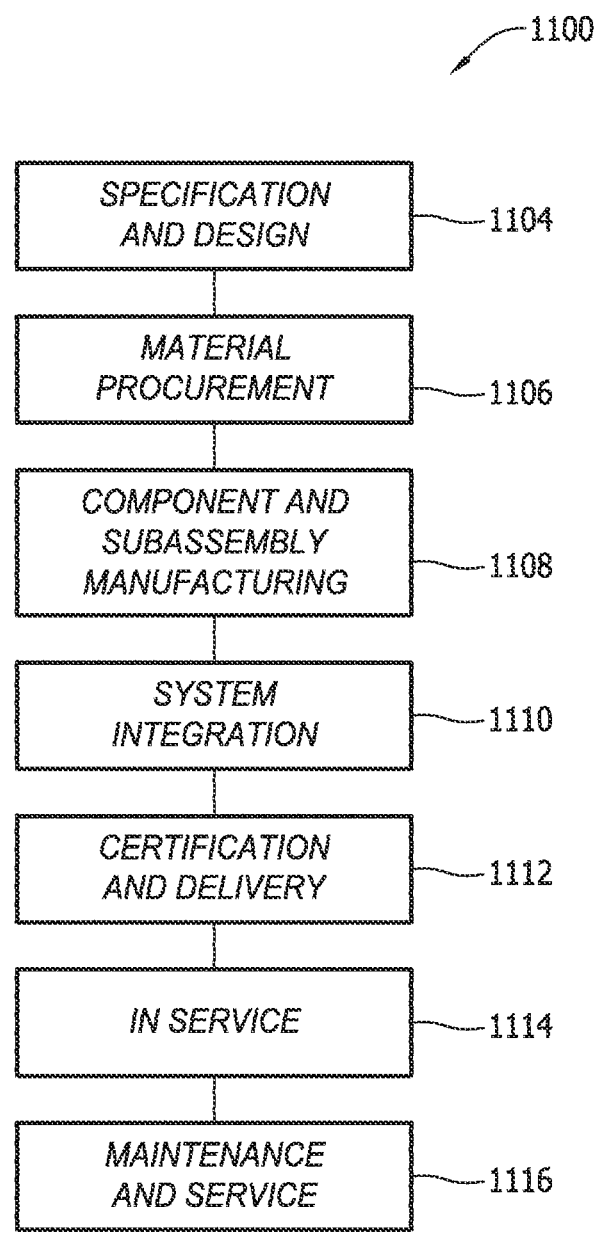
Figure 11:
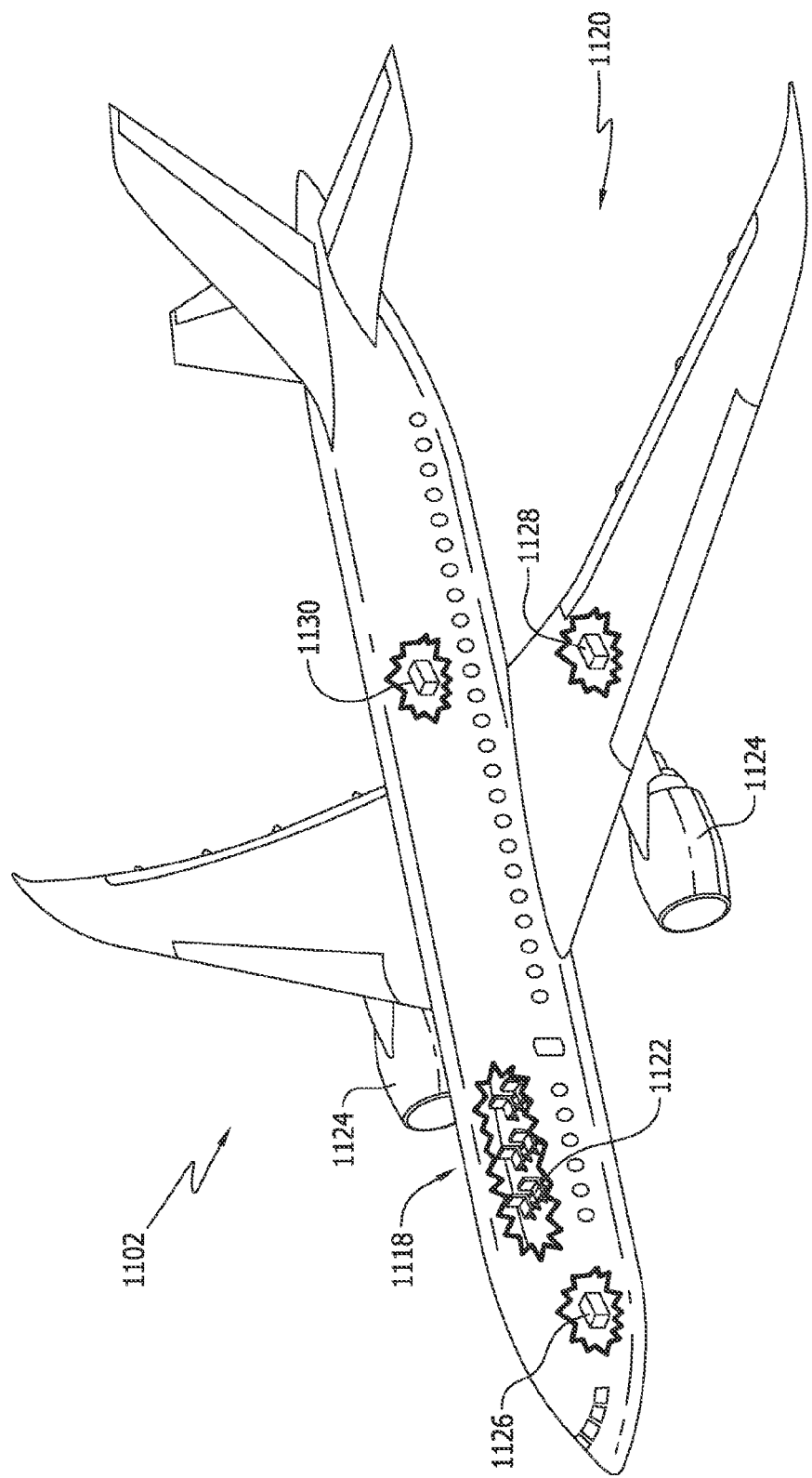

FIG. 10 is a block diagram of aircraft production and service methodology;

FIG. 11 is a schematic illustration of an aircraft.

In FIG. 1, above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships between the various disclosed elements are necessarily represented. Accordingly, couplings other than those depicted in the block diagrams may also exist. Dashed lines, if any, connecting the various elements and/or components represent couplings similar in function and purpose to those represented by solid lines; however, couplings represented by the dashed lines may either be selectively provided or may relate to alternative or optional aspects of the disclosure. Likewise, elements and/or components, if any, represented with dashed lines, indicate alternative or optional aspects of the disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIGS. 9A, 9B, and 10, above, the blocks may represent operations and/or portions thereof and lines connecting the various blocks do not imply any particular order or dependency of the operations or portions thereof. FIGS. 9A, 9B, and 10 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Referring generally to FIGS. 1-8, and with particular reference to FIGS. 1-5, one example of the present disclosure relates to apparatus 100 for manipulating fastener 10. Apparatus 100 comprises chamber 102 that includes first location 104 and second location 106 (e.g., FIG. 3). First actuator 108 is movable between first position 110, contiguous with first location 104, and second position 112, contiguous with second location 106. Second actuator 114 is movable between third position 116, contiguous with second location 106, and fourth position 118, contiguous with third location 120 (e.g., FIG. 4). Third actuator 122 is movable between fifth position 124, contiguous with third location 120, and sixth position 126, contiguous with fourth location 128 (e.g., FIG. 5). Third location 120 is at least partially outside chamber 102, and fourth location 128 is entirely outside chamber 102.

First actuator 108, second actuator 114, and third actuator 122 are configured to manipulate fastener 10 into a suitable position to be operated upon by tool 30. Referring e.g. to FIGS. 1 and 5, in one aspect of the disclosure, which may include at least a portion of the subject matter of any of the preceding and/or following examples and aspects, fourth location 128 is proximate to tool 30. In the illustrated example, fastener 10 is generally symmetric about fastener longitudinal axis 14. For example, fastener 10 is a rivet that has maximum outer diameter 12 defined at rim 18, and body 16 that has a body diameter 17. Referring e.g. to FIGS. 1 and 5, in one aspect of the disclosure, which may include at least a portion of the subject matter of any of the preceding and/or following examples and aspects, tool 30 comprises rivet die 32. It will be understood, however, that tool 30 may include any suitable tool for operating upon any correspondingly suitable type of fastener 10.

Referring e.g. to FIGS. 1 and 2, in one aspect of the disclosure, which may include at least a portion of the subject matter of any of the preceding and/or following examples and aspects, apparatus 100 comprises chassis 130, and each of first actuator 108, second actuator 114, and third actuator 122 is movably coupled to chassis 130. Referring e.g. to FIGS. 1 and 2, in one aspect of the disclosure, which may include at least a portion of the subject matter of any of the preceding and/or following examples and aspects, apparatus 100 comprises magazine 132 removably coupled to chassis 130. Referring e.g. to FIGS. 1 and 2, in one aspect of the disclosure, which may include at least a portion of the subject matter of any of the preceding and/or following examples and aspects, magazine 132 comprises tube 136 that includes inner diameter 138 having a clearance fit with maximum outer diameter 12 of fastener 10. Referring e.g. to FIGS. 1 and 2, in one aspect of the disclosure, which may include at least a portion of the subject matter of any of the preceding and/or following examples and aspects, tube 136 has a length sufficient to retain a plurality of fasteners 10 in an end-to-end arrangement. Referring e.g. to FIGS. 1 and 2, in one aspect of the disclosure, which may include at least a portion of the subject matter of any of the preceding and/or following examples and aspects, magazine 132 is pneumatically operatively coupled to compressed-gas source 148. Referring e.g. to FIGS. 1 and 2, in one aspect of the disclosure, which may include at least a portion of the subject matter of any of the preceding and/or following examples and aspects, first end 134 of magazine 132 is operatively coupled to chamber 102 when magazine 132 is removably coupled to chassis 130. For example, magazine first end 134 and first location 104 are coupled in flow communication by first bore 140 defined in a wall of chamber 102, and first bore 140 has a clearance fit with maximum outer diameter 12 of fastener 10. Thus, magazine 132 is configured to automatically supply each of the plurality of fasteners 10 in sequence to first location 104 for further manipulation by apparatus 100.

For ease of explanation only, the manipulation of fastener 10 by apparatus 100 will be described in part with regard to a reference frame illustrated in FIGS. 1-4. The reference frame includes first direction 20, second direction 22, and third direction 24. In addition, chamber 102 is illustrated without a top cover in FIGS. 1-4 to facilitate illustration of the manipulation of fastener 10 within chamber 102. It should be understood that chamber 102 may be provided with a top cover (not shown).

Referring e.g. to FIGS. 1 and 3, in one aspect of the disclosure, which may include at least a portion of the subject matter of any of the preceding and/or following examples and aspects, first path A traversable by fastener 10 passes through first location 104 (at which fastener 10 is illustrated in solid lines in FIG. 3) and second location 106 (at which fastener 10 is illustrated in dashed lines in FIG. 3). Referring e.g. to FIGS. 1 and 3, in one aspect of the disclosure, which may include at least a portion of the subject matter of any of the preceding and/or following examples and aspects, first actuator 108 is linearly movable between first position 110 (at which actuator 108 is illustrated in solid lines in FIG. 3) and second position 112 (at which actuator 108 is illustrated in dashed lines in FIG. 3) to move fastener 10 along the first path. More specifically, first actuator 108 is configured to extend within chamber 102 in a direction generally parallel to first direction 20, such that it contacts fastener 10 at first location 104 and pushes fastener 10 along first path A into second location 106. First actuator 108 may then be retracted back to first position 110 to await the delivery of another fastener 10 at first location 104. Referring e.g. to FIGS. 1 and 3, in one aspect of the disclosure, which may include at least a portion of the subject matter of any of the preceding and/or following examples and aspects, first actuator 108 is pneumatically operatively coupled to compressed-gas source 148 to facilitate automated operation of first actuator 108.

Referring e.g. to FIGS. 1, 3, and 4, in one aspect of the disclosure, which may include at least a portion of the subject matter of any of the preceding and/or following examples and aspects, second path B traversable by fastener 10 passes through second location 106 (at which fastener 10 is illustrated in dashed lines in FIG. 3) and third location 120 (at which fastener 10 is illustrated in FIG. 4). Referring e.g. to FIGS. 1, 3, and 4, in one aspect of the disclosure, which may include at least a portion of the subject matter of any of the preceding and/or following examples and aspects, second actuator 114 is rotatably movable between third position 116 (at which second actuator 114 is illustrated in FIG. 3) and fourth position 118 (at which second actuator 114 is illustrated in FIG. 4). More specifically, second actuator 114 is configured to rotate from third position 116 to fourth position 118 about an axis parallel to first direction 20, such that tip portion 142 of second actuator 114 is extended through aperture 144 defined in a wall of chamber 102. Tip portion 142 contacts fastener 10 at second location 106 and pushes fastener 10 along second path B into third location 120. While traversing second path B, fastener 10 passes at least partially through second bore 146 defined in a wall of chamber 102, and at least partially through slot 170 defined in chassis 130 and in communication with second bore 146. Second actuator 114 may then be rotated back to third position 116 to await the delivery of another fastener 10 at second location 106. Referring e.g. to FIGS. 1, 3, and 4, in one aspect of the disclosure, which may include at least a portion of the subject matter of any of the preceding and/or following examples and aspects, second actuator 114 is pneumatically operatively coupled to compressed-gas source 148 to facilitate automated operation of second actuator 114.

Referring e.g. to FIGS. 1, 3, and 4, in one aspect of the disclosure, which may include at least a portion of the subject matter of any of the preceding and/or following examples and aspects, each of first path A and second path B is linear. In the illustrated example, each of first path A and second path B is linear due to the configuration of chamber 102, first actuator 108, and second actuator 114. Moreover, first path A is generally parallel to first direction 20, and second path B is generally parallel to second direction 22. Referring e.g. to FIGS. 1, 3, and 4, in one aspect of the disclosure, which may include at least a portion of the subject matter of any of the preceding and/or following examples and aspects, first path A and second path B are non-parallel. Referring e.g. to FIGS. 1, 3, and 4, in one aspect of the disclosure, which may include at least a portion of the subject matter of any of the preceding and/or following examples and aspects, first path A and second path B are generally perpendicular. It will be understood, however, that any of chamber 102, first actuator 108, and second actuator 114 may be configured such that first path A and second path B are other than linear and/or other than non-parallel or generally perpendicular to each other.

Referring e.g. to FIGS. 1, 2, 4 and 5, in one aspect of the disclosure, which may include at least a portion of the subject matter of any of the preceding and/or following examples and aspects, third path C traversable by fastener 10 passes through third location 120 (at which fastener 10 is illustrated in FIG. 4) and fourth location 128 (at which fastener 10 is illustrated in FIG. 5). Referring e.g. to FIGS. 1, 2, 4 and 5, in one aspect of the disclosure, which may include at least a portion of the subject matter of any of the preceding and/or following examples and aspects, third actuator 122 is rotatably movable between fifth position 124 (at which third actuator 122 is illustrated in FIG. 2) and sixth position 126 (at which third actuator 122 is illustrated in FIG. 5). More specifically, third actuator 122 in fifth position 124 is configured to releasably engage fastener 10 at third location 120. Third actuator 122 is configured to rotate from fifth position 124 to sixth position 126 about an axis parallel to first direction 20. Third actuator 122 also is configured to maintain the releasable engagement of fastener 10 as third actuator 122 moves to sixth position 126. Referring e.g. to FIGS. 1, 2, 4 and 5, in one aspect of the disclosure, which may include at least a portion of the subject matter of any of the preceding and/or following examples and aspects, third path C is arcuate. Fastener 10 is positioned in fourth location 128 when third actuator 122 is in sixth position 126. Referring e.g. to FIGS. 1, 2, 4 and 5, in one aspect of the disclosure, which may include at least a portion of the subject matter of any of the preceding and/or following examples and aspects, third actuator 122 is pneumatically operatively coupled to compressed-gas source 148 to facilitate automated operation of third actuator 122.

Referring e.g. to FIGS. 1 and 3-5, in one aspect of the disclosure, which may include at least a portion of the subject matter of any of the preceding and/or following examples and aspects, fastener 10 is oriented in a first direction when fastener 10 is in one of first location 104, second location 106, and third location 120, fastener 10 is oriented in a second direction when fastener 10 is in fourth location 128, and the first direction and the second direction are non-parallel. In the illustrated example, fastener longitudinal axis 14 is substantially parallel to second direction 22 when fastener 10 is in each of first location 104, second location 106, and third location 120, and fastener longitudinal axis 14 is substantially parallel to third direction 24 when fastener 10 is in fourth location 128. Referring e.g. to FIGS. 1 and 3-5, in one aspect of the disclosure, which may include at least a portion of the subject matter of any of the preceding and/or following examples and aspects, the first direction and the second direction are generally perpendicular. Referring e.g. to FIGS. 1 and 4-5, in one aspect of the disclosure, which may include at least a portion of the subject matter of any of the preceding and/or following examples and aspects, fastener 10 has a first directional orientation in third location 120 and a second directional orientation in fourth location 128, and the first directional orientation and the second directional orientation are different.

Referring e.g. to FIGS. 1, 2, and 5, in one aspect of the disclosure, which may include at least a portion of the subject matter of any of the preceding and/or following examples and aspects, apparatus 100 comprises first stop 180 abutting third actuator 122 when third actuator 122 is in fifth position 124. Referring e.g. to FIGS. 1, 2, and 5, in one aspect of the disclosure, which may include at least a portion of the subject matter of any of the preceding and/or following examples and aspects, apparatus 100 comprises second stop 182 abutting third actuator 122 when third actuator 122 is in sixth position 126. First stop 180 facilitates accurate positioning of third actuator 122 in fifth position 124, such that third actuator 122 properly releasably engages fastener 10 at third location 120. Similarly, second stop 182 facilitates accurate positioning of third actuator 122 in sixth position 126, such that third actuator 122 properly positions fastener 10 at fourth location 128 proximate to tool 30. Referring e.g. to FIGS. 1 and 5, in one aspect of the disclosure, which may include at least a portion of the subject matter of any of the preceding and/or following examples and aspects, chassis 130 is movable to align fastener 10 with workpiece 90 when fastener 10 is in fourth location 128.

Referring e.g. to FIGS. 1, and 4-6, in one aspect of the disclosure, which may include at least a portion of the subject matter of any of the preceding and/or following examples and aspects, third actuator 122 comprises pair of retaining fingers 150. Pair of retaining fingers 150 is disposed within slot 170 of chassis 130 when third actuator 122 is in fifth position 124. First end 152 of pair of retaining fingers 150 is coupled to arm 164 of third actuator 122. Second end 154 of pair of retaining fingers 150, generally opposite first end 152, is configured to releasably engage fastener 10. In the illustrated example, each prong 151 of pair of retaining fingers 150 includes curved edge 156 at second end 154. Curved edges 156 of pair of retaining fingers 150 cooperate to accept body diameter 17 of fastener 10 in a friction fit. More specifically, as fastener 10 traverses second path B into third location 120 with pair of retaining fingers 150 disposed in slot 170, fastener 10 is engaged by pair of retaining fingers 150 in the friction fit.

Pair of retaining fingers 150 may be resilient to facilitate releasable engagement with fastener 10. That is, each prong 151 may be suitably shaped and formed from a suitable material to deform slightly to accommodate a passage of fastener body 16 through curved edges 156, to maintain sufficient stiffness to enable pair of retaining fingers 150 to retain fastener body 16 in the friction fit, and to enable pair of retaining fingers 150 to disengage from fastener body 16 as third actuator 122 rotates back to fifth position 124 after fastener 10 is at least partially inserted into workpiece 90.

In the illustrated example, each prong 151 includes beveled surface 158 adjacent to curved edge 156. Beveled surface 158 facilitates a desired resiliency of pair of retaining fingers 150. Additionally, beveled surfaces 158 cooperate to bear against rim 18 of fastener 10 when fastener 10 is pushed into releasable engagement with pair of retaining fingers 150, thus facilitating a consistent alignment and a consistent depth of engagement of fastener 10 by pair of retaining fingers 150. It will be understood, however, that suitable structure other than, or in addition to, pair of retaining fingers 150 may be used to enable third actuator 122 in fifth position 124 to releasably engage fastener 10 at third location 120.

Pair of retaining fingers 150 further comprises center point 166 defined between respective curved edges 156 of prongs 151. A distance between center point 166 and center of rotation 162 of third actuator arm 164 defines third actuator radius 160. Pair of retaining fingers 150 extends between first end 152 and second end 154 in an arcuate shape with a radius of curvature 168 substantially equal to third actuator radius 160. Radius of curvature 168 enables pair of retaining fingers 150 to slide out of slot 170 in a clearance fit as third actuator 122 rotates from fifth position 124 to sixth position 126, and to slide into slot 170 in a clearance fit as third actuator 122 rotates back from sixth position 126 to fifth position 124.

With particular reference to FIG. 2, first actuator 108, second actuator 114, and third actuator 122 are configured to cooperate to manipulate fastener 10 into fourth location 128 proximate tool 30 in a confined space. For example, in the illustrated example, each of first location 104, second location 106, and third location 120 of fastener 10, as well as first position 110 and second position 112 of first actuator 108, third position 116 and fourth position 118 of second actuator 114, and fifth position 124 of third actuator 122, are disposed between first plane 70 and second plane 72. In the illustrated example, first distance 74 between first plane 70 and second plane 72 is sufficiently small to enable apparatus 100 to be used in cooperation with an assembly tool in a confined space to assemble, for example, an aft fairing heat shield of an aircraft. Moreover, second distance 76 between second plane 72 and workpiece 90 facilitates an avoidance of accidental contact between apparatus 100 and workpiece 90.

It will be understood that first actuator 108 may be other than linearly movable between first position 110 and second position 112. Referring e.g. to FIGS. 1 and 7, in one aspect of the disclosure, which may include at least a portion of the subject matter of any of the preceding and/or following examples and aspects, first actuator 108 is rotatably movable between first position 110 and second position 112. Referring e.g. to FIGS. 1 and 7, in one aspect of the disclosure, which may include at least a portion of the subject matter of any of the preceding and/or following examples and aspects, first path A is arcuate. In the illustrated example, chamber 102 has an arcuate shape, and first path A is correspondingly arcuate. First actuator 108 includes projection 109 that extends through slot 103 in the bottom of chamber 102. As first actuator 108 rotates, projection 109 rotates from first position 110 (at which projection 109 is illustrated in dashed lines in FIG. 7) to second position 112 (at which projection 109 is illustrated in solid lines in FIG. 7). Projection 109 contacts fastener 10 at first location 104 (at which fastener 10 is illustrated in dashed lines in FIG. 7) and pushes fastener 10 along first path A within chamber 102 to second location 106 (at which fastener 10 is illustrated in solid lines in FIG. 7).

It will be understood further that second actuator 114 may be other than rotatably movable between third position 116 and fourth position 118. Referring e.g. to FIGS. 1 and 8, in one aspect of the disclosure, which may include at least a portion of the subject matter of any of the preceding and/or following examples and aspects, second actuator 114 is linearly movable between third position 116 and fourth position 118. (In FIG. 8, second actuator 114 is shown in solid lines at third position 116 and in dashed lines at fourth position 118.) As second actuator 114 extends, it contacts fastener 10 at second location 106 and pushes fastener 10 along second path B, at least partially through second bore 146 defined in a wall of chamber 102, and into third location 120 (at which fastener 10 is illustrated in FIG. 8).

Referring generally to FIG. 1-8 and particularly to FIGS. 9A and 9B, one example of the present disclosure relates to a method 200 of manipulating fastener 10. The method comprises delivering fastener 10 to first location 104 in chamber 102 (block 202), moving fastener 10 from first location 104 to second location 106 in chamber 102 using first actuator 108 (block 210), moving fastener 10 from second location 106 to third location 120 using second actuator 114 (block 226), and moving fastener 10 from third location 120 to fourth location 128 using third actuator 122 (block 240), wherein third location 120 is at least partially outside chamber 102 and fourth location 128 is entirely outside chamber 102.

Referring generally to FIGS. 1-8 and particularly to FIGS. 9A and 9B, in one aspect of the disclosure, which may include at least a portion of the subject matter of any of the preceding and/or following examples and aspects, delivering fastener 10 to first location 104 in chamber 102 comprises positioning fastener 10 in a first directional orientation (block 204), moving fastener 10 from first location 104 to second location 106 in chamber 102 comprises maintaining fastener 10 in the first directional orientation (block 218), moving fastener 10 from second location 106 to third location 120 comprises maintaining fastener 10 in the first directional orientation (block 232), and moving fastener 10 from third location 120 to fourth location 128 comprises positioning fastener 10 in a second directional orientation that is non-parallel to the first directional orientation (block 246). For example, fastener longitudinal axis 14 may be substantially parallel to second direction 22 when fastener 10 is in each of first location 104, second location 106, and third location 120, and fastener longitudinal axis 14 may be substantially parallel to third direction 24 when fastener 10 is in fourth location 128. Referring generally to FIGS. 1-8 and particularly to FIGS. 9A and 9B, in one aspect of the disclosure, which may include at least a portion of the subject matter of any of the preceding and/or following examples and aspects, the second directional orientation is generally perpendicular to the first directional orientation.

Referring generally to FIGS. 1-8 and particularly to FIGS. 9A and 9B, in one aspect of the disclosure, which may include at least a portion of the subject matter of any of the preceding and/or following examples and aspects, delivering fastener 10 to first location 104 in chamber 102 comprises delivering fastener 10 from magazine 132 (block 206). Referring generally to FIGS. 1-8 and particularly to FIGS. 9A and 9B, in one aspect of the disclosure, which may include at least a portion of the subject matter of any of the preceding and/or following examples and aspects, delivering fastener 10 to first location 104 in chamber 102 comprises pneumatically operating magazine 132 using compressed-gas source 148 (block 208).

Referring generally to FIGS. 1-8 and particularly to FIGS. 9A and 9B, in one aspect of the disclosure, which may include at least a portion of the subject matter of any of the preceding and/or following examples and aspects, method 200 comprises operatively coupling first end 134 of magazine 132 to chamber 102 (block 256). Referring generally to FIGS. 1-8 and particularly to FIGS. 9A and 9B, in one aspect of the disclosure, which may include at least a portion of the subject matter of any of the preceding and/or following examples and aspects, method 200 comprises retaining plurality of fasteners 10 in magazine 132 (block 258). Referring generally to FIGS. 1-8 and particularly to FIGS. 9A and 9B, in one aspect of the disclosure, which may include at least a portion of the subject matter of any of the preceding and/or following examples and aspects, plurality of fasteners 10 in magazine 132 are retained in an end-to-end arrangement.

Referring generally to FIGS. 1-8, and particularly to FIGS. 9A and 9B, in one aspect of the disclosure, which may include at least a portion of the subject matter of any of the preceding and/or following examples and aspects, moving fastener 10 from first location 104 to second location 106 comprises moving fastener 10 along first path A that is linear (block 212), and moving fastener 10 from second location 106 to third location 120 comprises moving fastener 10 along second path B that is linear (block 228). Referring generally to FIGS. 1-8 and particularly to FIGS. 9A and 9B, in one aspect of the disclosure, which may include at least a portion of the subject matter of any of the preceding and/or following examples and aspects, moving fastener 10 from the first location to the second location comprises moving the fastener along first path A that is arcuate (block 216). Referring generally to FIGS. 1-8 and particularly to FIGS. 9A and 9B, in one aspect of the disclosure, which may include at least a portion of the subject matter of any of the preceding and/or following examples and aspects, first path A and second path B are non-parallel. Referring generally to FIGS. 1-8 and particularly to FIGS. 9A and 9B, in one aspect of the disclosure, which may include at least a portion of the subject matter of any of the preceding and/or following examples and aspects, first path A and second path B are generally perpendicular. For example, first path A can generally parallel to first direction 20, and second path B can be generally parallel to second direction 22, as described previously.

Referring generally to FIGS. 1-8 and particularly to FIGS. 9A and 9B, in one aspect of the disclosure, which may include at least a portion of the subject matter of any of the preceding and/or following examples and aspects, moving fastener 10 from first location 104 to second location 106 using first actuator 108 comprises moving first actuator 108 between first position 110 and second position 112 (block 220). Referring generally to FIGS. 1-8 and particularly to FIGS. 9A and 9B, in one aspect of the disclosure, which may include at least a portion of the subject matter of any of the preceding and/or following examples and aspects, moving first actuator 108 between first position 110 and second position 112 comprises translating first actuator 108 (block 222). Referring generally to FIGS. 1-8 and particularly to FIGS. 9A and 9B, in one aspect of the disclosure, which may include at least a portion of the subject matter of any of the preceding and/or following examples and aspects, moving first actuator 108 between first position 110 and second position 112 comprises rotating first actuator 108 (block 224). Referring generally to FIGS. 1-8 and particularly to FIGS. 9A and 9B, in one aspect of the disclosure, which may include at least a portion of the subject matter of any of the preceding and/or following examples and aspects, moving first actuator 108 between first position 110 and second position 112 comprises pneumatically operating first actuator 108 using compressed-gas source 148 (block 214).

Referring generally to FIGS. 1-8 and particularly to FIGS. 9A and 9B, in one aspect of the disclosure, which may include at least a portion of the subject matter of any of the preceding and/or following examples and aspects, moving fastener 10 from second location 106 to third location 120 using second actuator 114 comprises moving second actuator 114 between third position 116 and fourth position 118 (block 234). Referring generally to FIGS. 1-8 and particularly to FIGS. 9A and 9B, in one aspect of the disclosure, which may include at least a portion of the subject matter of any of the preceding and/or following examples and aspects, moving second actuator 114 between third position 116 and fourth position 118 comprises translating second actuator 114 (block 236). Referring generally to FIGS. 1-8 and particularly to FIGS. 9A and 9B, in one aspect of the disclosure, which may include at least a portion of the subject matter of any of the preceding and/or following examples and aspects, moving second actuator 114 between third position 116 and fourth position 118 comprises rotating second actuator 114 (block 238). Referring generally to FIGS. 1-8 and particularly to FIGS. 9A and 9B, in one aspect of the disclosure, which may include at least a portion of the subject matter of any of the preceding and/or following examples and aspects, moving second actuator 114 between third position 116 and fourth position 118 comprises pneumatically operating second actuator 114 using compressed-gas source 148 (block 230). Referring generally to FIGS. 1-8 and particularly to FIGS. 9A and 9B, in one aspect of the disclosure, which may include at least a portion of the subject matter of any of the preceding and/or following examples and aspects, first actuator 108 is moved from second position 112 to first position 110 before second actuator 114 moves fastener 10 from second location 106 to third location 120.

Referring generally to FIGS. 1-8 and particularly to FIGS. 9A and 9B, in one aspect of the disclosure, which may include at least a portion of the subject matter of any of the preceding and/or following examples and aspects, moving fastener 10 from third location 120 to fourth location 128 comprises moving fastener 10 along third path C that is arcuate (block 242). Referring generally to FIGS. 1-8 and particularly to FIGS. 9A and 9B, in one aspect of the disclosure, which may include at least a portion of the subject matter of any of the preceding and/or following examples and aspects, moving fastener 10 from third location 120 to fourth location 128 comprises moving fastener 10 proximate to tool 30 (block 252). Referring generally to FIGS. 1-8 and particularly to FIGS. 9A and 9B, in one aspect of the disclosure, which may include at least a portion of the subject matter of any of the preceding and/or following examples and aspects, moving fastener 10 from third location 120 to fourth location 128 comprises moving fastener 10 proximate to rivet die 32 (block 254).

Referring generally to FIGS. 1-8 and particularly to FIGS. 9A and 9B, in one aspect of the disclosure, which may include at least a portion of the subject matter of any of the preceding and/or following examples and aspects, moving fastener 10 from third location 120 to fourth location 128 using third actuator 122 comprises moving third actuator 122 between fifth position 124 and sixth position 126 (block 248). Referring generally to FIGS. 1-8 and particularly to FIGS. 9A and 9B, in one aspect of the disclosure, which may include at least a portion of the subject matter of any of the preceding and/or following examples and aspects, second actuator 114 is moved from fourth position 118 to third position 116 before third actuator 122 moves fastener 10 from third location 120 to fourth location 128. Referring generally to FIGS. 1-8 and particularly to FIGS. 9A and 9B, in one aspect of the disclosure, which may include at least a portion of the subject matter of any of the preceding and/or following examples and aspects, moving third actuator 122 between fifth position 124 and sixth position 126 comprises rotating third actuator 122 (block 250). Referring generally to FIGS. 1-8 and particularly to FIGS. 9A and 9B, in one aspect of the disclosure, which may include at least a portion of the subject matter of any of the preceding and/or following examples and aspects, moving third actuator 122 between fifth position 124 and sixth position 126 comprises pneumatically operating third actuator 122 using compressed-gas source 148 (block 244).

Referring generally to FIGS. 1-8 and particularly to FIGS. 9A and 9B, in one aspect of the disclosure, which may include at least a portion of the subject matter of any of the preceding and/or following examples and aspects, method 200 comprises preventing third actuator 122 from moving past fifth position 124 using first stop 180 (block 266). Referring generally to FIGS. 1-8 and particularly to FIGS. 9A and 9B, in one aspect of the disclosure, which may include at least a portion of the subject matter of any of the preceding and/or following examples and aspects, method 200 comprises preventing third actuator 122 from moving past sixth position 126 using second stop 182 (block 268).

Referring generally to FIGS. 1-8 and particularly to FIGS. 9A and 9B, in one aspect of the disclosure, which may include at least a portion of the subject matter of any of the preceding and/or following examples and aspects, method 200 comprises releasably engaging fastener 10 in a friction fit using third actuator 122 (block 260). Referring generally to FIGS. 1-8 and particularly to FIGS. 9A and 9B, in one aspect of the disclosure, which may include at least a portion of the subject matter of any of the preceding and/or following examples and aspects, fastener 10 in third location 120 is releasably engaged by third actuator 122 in fifth position 124. Referring generally to FIGS. 1-8 and particularly to FIGS. 9A and 9B, in one aspect of the disclosure, which may include at least a portion of the subject matter of any of the preceding and/or following examples and aspects, fastener 10 in fourth location 128 is releasably engaged by third actuator 122 in sixth position 126.

Referring generally to FIGS. 1-8 and particularly to FIGS. 9A and 9B, in one aspect of the disclosure, which may include at least a portion of the subject matter of any of the preceding and/or following examples and aspects, method 200 comprises inserting fastener 10 at least partially into workpiece 90 (block 262), and disengaging third actuator 122 from fastener 10 by moving third actuator 122 away from sixth position 126 (block 264). For example, third actuator 122 may include pair of retaining fingers 150 that are suitably shaped and formed from a suitable material to maintain sufficient stiffness to retain fastener body 16 in the friction fit during an initial insertion of fastener 10 into workpiece 90, and to enable disengagement of retaining fingers 150 from fastener body 16 as third actuator 122 rotates back to fifth position 124 after fastener 10 is at least partially inserted into workpiece 90.

Referring generally to FIGS. 1-8 and particularly to FIGS. 9A and 9B, in one aspect of the disclosure, which may include at least a portion of the subject matter of any of the preceding and/or following examples and aspects, each of first actuator 108, second actuator 114, and third actuator 122 is movably coupled to chassis 130, and method 200 comprises moving chassis 130 to align fastener 10 with workpiece 90 when fastener 10 is in fourth location 128 relative to chassis 130 (block 270). For example, chassis 130 may be movable in each of first direction 20 and second direction 22 to align fastener 10 and a predetermined insertion point in workpiece 90 relative to third direction 24. Referring generally to FIGS. 1-8 and particularly to FIGS. 9A and 9B, in one aspect of the disclosure, which may include at least a portion of the subject matter of any of the preceding and/or following examples and aspects, method 200 comprises orienting fastener 10 in a second direction when fastener 10 is in fourth location 128 (block 272), and moving chassis 130 in the second direction such that fastener 10 is at least partially inserted into workpiece 90 (block 274). For example, fastener longitudinal axis 14 may be substantially parallel to third direction 24 when fastener 10 is in fourth location 128, and chassis 130 may be moved in third direction 24 towards workpiece 90 such that fastener 10 is at least partially inserted into workpiece 90 at the predetermined insertion point. It should be understood that the alignment and insertion process may be automated.

Referring generally to FIGS. 1-8 and particularly to FIGS. 9A and 9B, in one aspect of the disclosure, which may include at least a portion of the subject matter of any of the preceding and/or following examples and aspects, moving chassis 130 in third direction 24 such that fastener 10 is at least partially inserted into workpiece 90 comprises moving chassis 130 in third direction 24 such that fastener 10 is inserted into workpiece 90 to a first depth (block 276), disengaging third actuator 122 from fastener 10 by returning third actuator 122 to fifth position 124 (block 278), and moving chassis 130 in third direction 24 such that fastener 10 is inserted into workpiece 90 to a second depth (block 280). For example, after fastener 10 is inserted into workpiece 90 to the first depth, engagement with third actuator 122 is no longer necessary to maintain fastener 10 in the second orientation substantially parallel to third direction 24. Therefore, third actuator 122 may be moved away from sixth position 126 to prevent third actuator 122 from interfering with insertion of fastener 10 to the second depth within workpiece 90. After fastener 10 is inserted to the second depth, fastener 10 may be coupled to workpiece 90. For example, fastener 10 may be a rivet, and a collar swaging tool (not shown) may be disposed opposite tool 30 to couple fastener 10 to workpiece 90.

Examples of the disclosure may be described in the context of an aircraft manufacturing and service method 1100 as shown in FIG. 10 and aircraft 1102 as shown in FIG. 11. During pre-production, illustrative method 1100 may include specification and design 1104 of aircraft 1102 and material procurement 1106. During production, component and subassembly manufacturing 1108 and system integration 1110 of aircraft 1102 take place. Thereafter, aircraft 1102 may go through certification and delivery 1112 to be placed in service 1114. While in service by a customer, aircraft 1102 is scheduled for routine maintenance and service 1116 (which may also include modification, reconfiguration, refurbishment, and so on).

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 11, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles of the invention may be applied to other industries, such as the automotive industry. Accordingly, in addition to aircraft 1102, the principles disclosed herein may apply to other vehicles, e.g., land vehicles, marine vehicles, space vehicles, etc.

Apparatus and methods shown or described herein may be employed during any one or more of the stages of the manufacturing and service method 1100. For example, components or subassemblies corresponding to component and subassembly manufacturing 1108 may be fabricated or manufactured in a manner similar to components or subassemblies produced while aircraft 1102 is in service. Also, one or more aspects of the apparatus, method, or combination thereof may be utilized during production stages 1108 and 1110, for example, by substantially expediting assembly of or reducing the cost of aircraft 1102. Similarly, one or more aspects of the apparatus or method realizations, or a combination thereof, may be utilized, for example and without limitation, while aircraft 1102 is in service, e.g., maintenance and service 1116.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

Therefore, it is to be understood that the disclosure is not to be limited to the specific examples presented and that modifications and other examples and aspects are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. An apparatus for manipulating a fastener, the apparatus comprising:
 a chamber including a first location and a second location;
 a first actuator movable between a first position, contiguous with the first location, and a second position, contiguous with the second location;
 a second actuator movable between a third position, contiguous with the second location, and a fourth position, contiguous with a third location; and
 a third actuator movable between a fifth position, contiguous with the third location, and a sixth position, contiguous with a fourth location, wherein the third location is at least partially outside the chamber and the fourth location is entirely outside the chamber.

2. The apparatus of claim 1, wherein:
 a first path traversable by the fastener passes through the first location and the second location;
 a second path traversable by the fastener passes through the second location and the third location; and
 a third path traversable by the fastener passes through the third location and the fourth location.

3. The apparatus of claim 2, wherein each of the first path and the second path is linear.

4. The apparatus of claim 1, wherein the first actuator is linearly movable between the first position and the second position.

5. The apparatus of claim 1, wherein the second actuator is rotatably movable between the third position and the fourth position.

6. The apparatus of claim 1, wherein the third actuator is rotatably movable between the fifth position and the sixth position.

7. The apparatus of claim 1, wherein the third actuator comprises a pair of retaining fingers.

8. The apparatus of claim 1, further comprising a chassis, wherein each of the first actuator, the second actuator, and the third actuator is movably coupled to the chassis.

9. The apparatus of claim 8, further comprising a magazine removably coupled to the chassis, wherein a first end of the magazine is operatively coupled to the chamber when the magazine is removably coupled to the chassis.

10. The apparatus of claim 8, wherein the chassis is movable to align the fastener with a workpiece when the fastener is in the fourth location.

11. A method of manipulating a fastener, the method comprising:
 delivering the fastener to a first location in a chamber;
 moving the fastener from the first location to a second location in the chamber using a first actuator movable between a first position, contiguous with the first location, and a second position, contiguous with the second location;

moving the fastener from the second location to a third location using a second actuator movable between a third position, contiguous with the second location, and a fourth position, contiguous with the third location; and moving the fastener from the third location to a fourth location using a third actuator movable between a fifth position, contiguous with the third location, and a sixth position, contiguous with the fourth location, wherein the third location is at least partially outside the chamber and the fourth location is entirely outside the chamber.

12. The method of claim 11, wherein:

moving the fastener from the first location to the second location comprises moving the fastener along a first path that is linear; and moving the fastener from the second location to the third location comprises moving the fastener along a second path that is linear.

13. The method of claim 11, wherein:

delivering the fastener to the first location in the chamber comprises positioning the fastener in a first directional orientation;

moving the fastener from the first location to the second location in the chamber comprises maintaining the fastener in the first directional orientation;

moving the fastener from the second location to the third location comprises maintaining the fastener in the first directional orientation; and moving the fastener from the third location to the fourth location comprises positioning the fastener in a second directional orientation that is non-parallel to the first directional orientation.

14. The method of claim 11, further comprising operatively coupling a first end of a magazine to the chamber.

15. The method of claim 14, further comprising retaining a plurality of fasteners in the magazine.

16. The method of claim 11, wherein moving the fastener from the first location to the second location using the first actuator comprises moving the first actuator between a first position and a second position.

17. The method of claim 16, wherein moving the fastener from the second location to the third location using the second actuator comprises moving the second actuator between a third position and a fourth position.

18. The method of claim 17, wherein moving the fastener from the third location to the fourth location using the third actuator comprises moving the third actuator between a fifth position and a sixth position.

19. The method of claim 18, further comprising releasably engaging the fastener in a friction fit using the third actuator.

20. The method of claim 18, wherein each of the first actuator, the second actuator, and the third actuator is movably coupled to a chassis, the method further comprising moving the chassis to align the fastener with a workpiece when the fastener is in the fourth location relative to the chassis.

* * * * *